Dec. 23, 1958  P. R. PERKINS  2,865,110
VIBRATING SHELF-TYPE DRIER
Filed Feb. 21, 1955  3 Sheets-Sheet 1
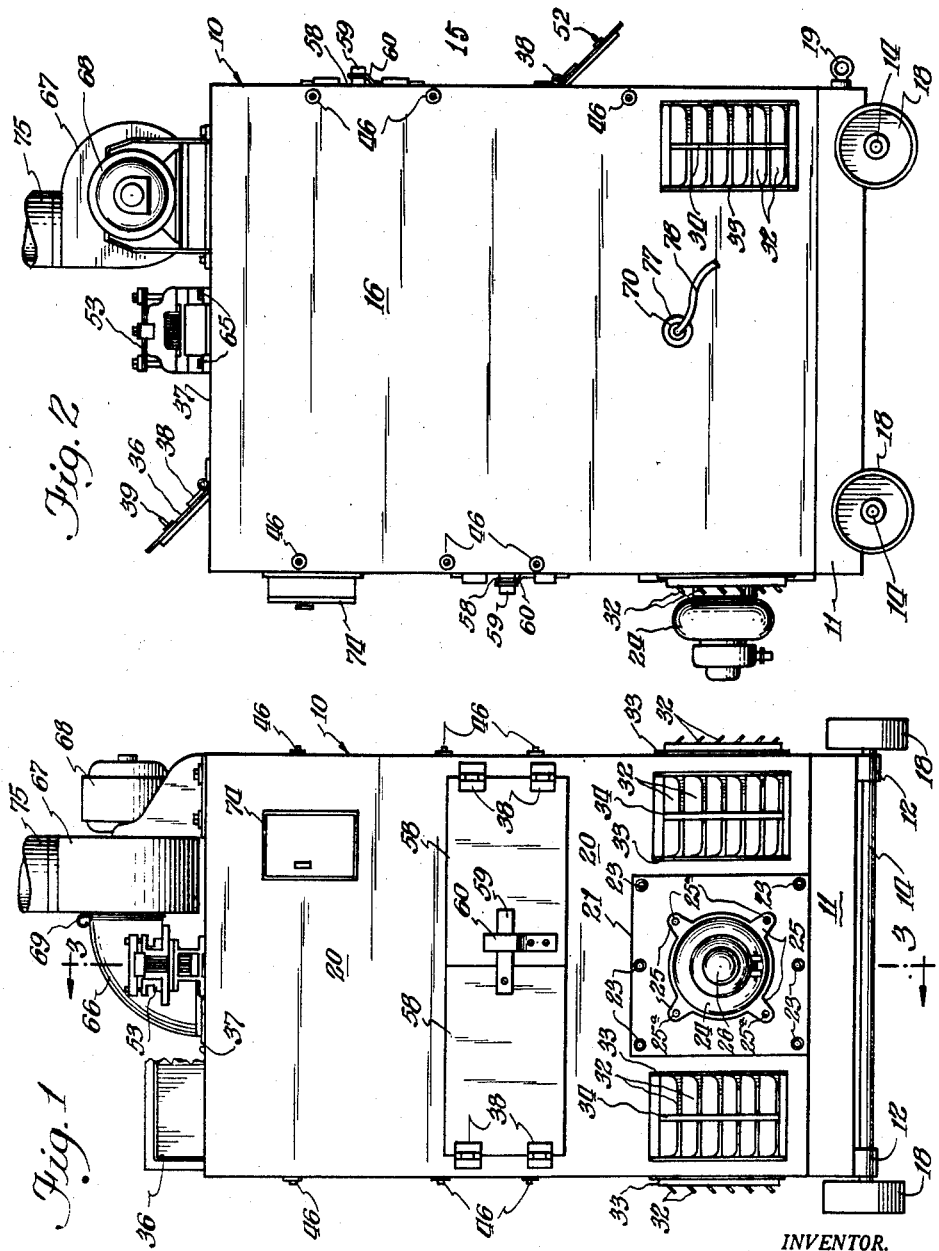
INVENTOR.
Philip R. Perkins
BY
Everett A. Johnson
Attorney

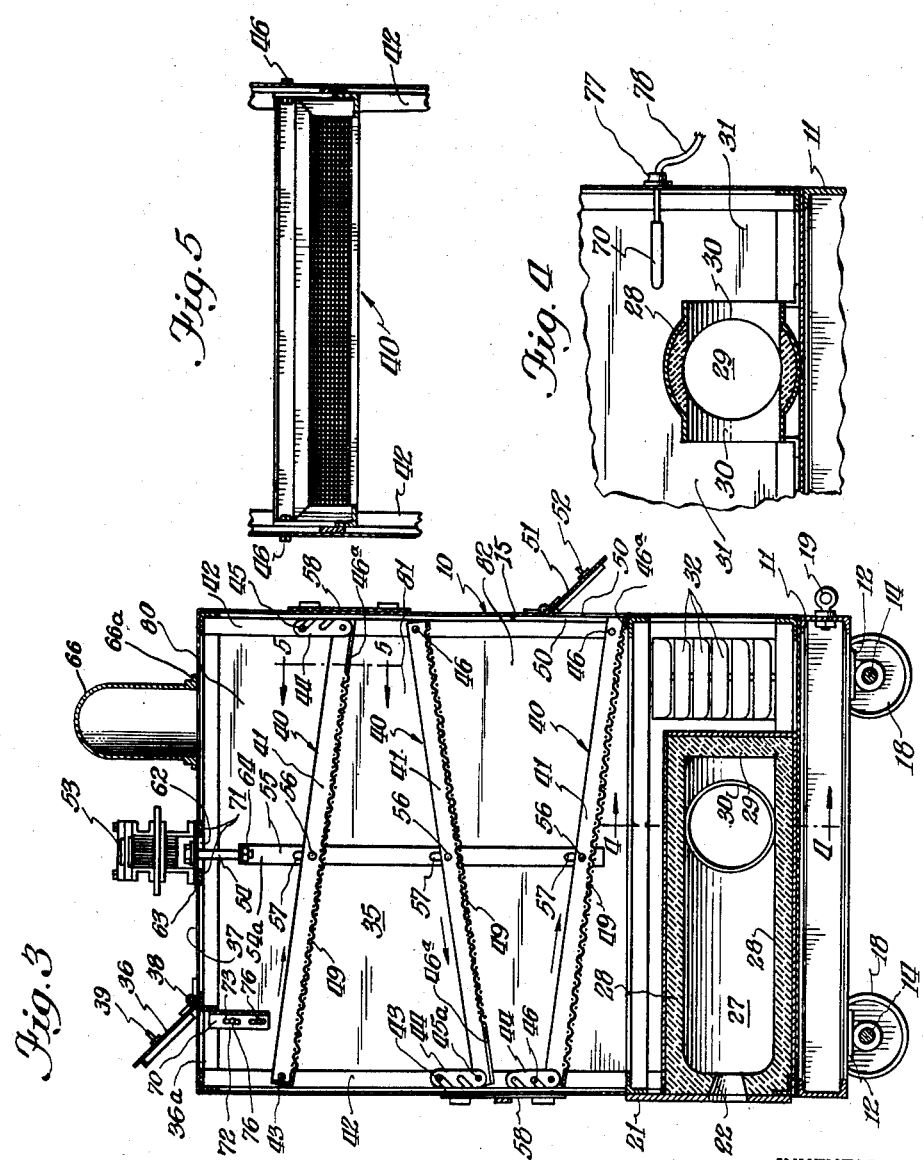

Dec. 23, 1958 P. R. PERKINS 2,865,110
VIBRATING SHELF-TYPE DRIER
Filed Feb. 21, 1955 3 Sheets-Sheet 3
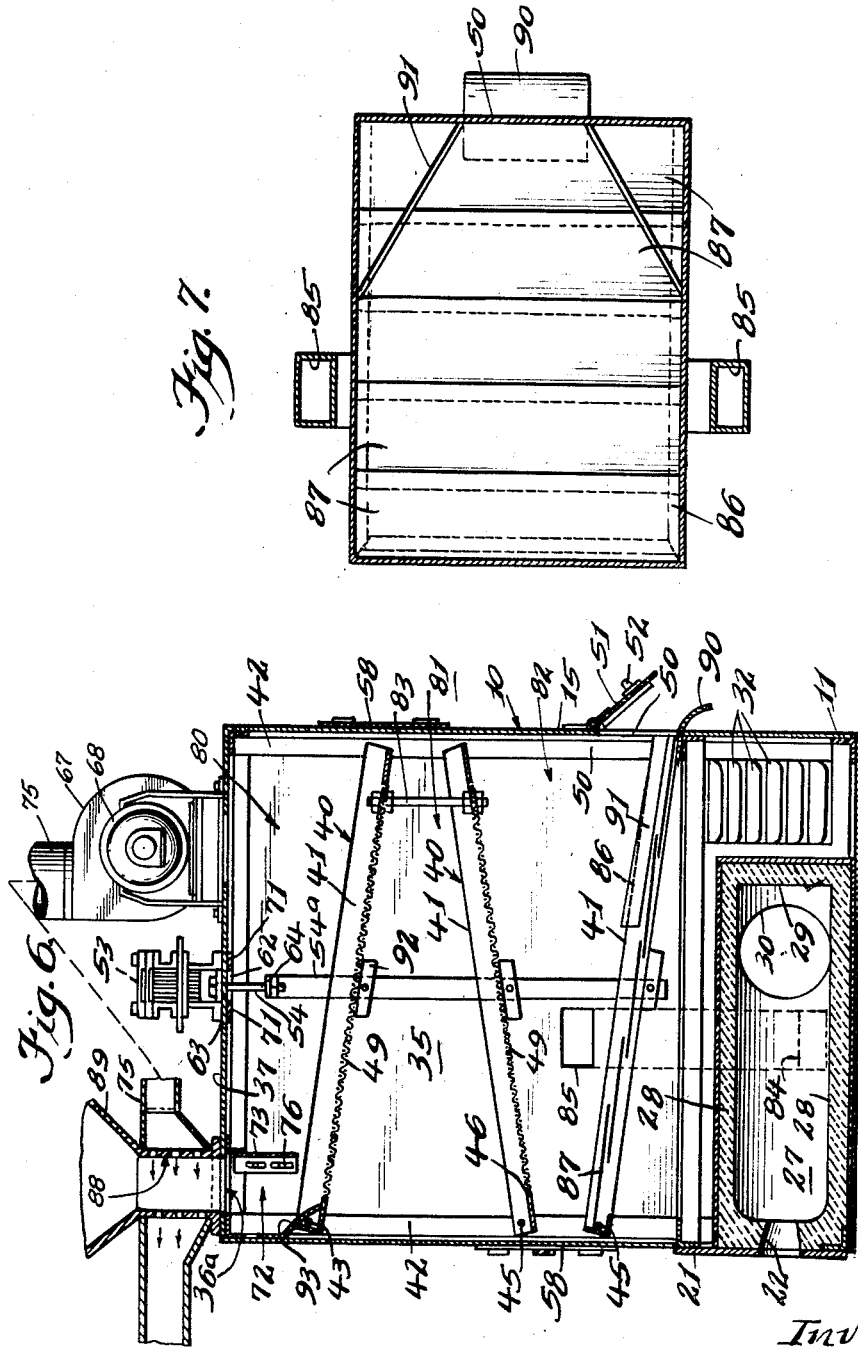
Inventor.
Philip R. Perkins.
By Everett A. Johnson
Attorney.

United States Patent Office 2,865,110
Patented Dec. 23, 1958

2,865,110

VIBRATING SHELF-TYPE DRIER

Philip R. Perkins, Skokie, Ill.

Application February 21, 1955, Serial No. 489,496

3 Claims. (Cl. 34—86)

This invention relates to process and apparatus for lowering or removing excess moisture from materials of mixed particle size. More specifically the invention relates to a system for drying grain so as to aid in preserving the natural qualities while preventing spoilage in storage and thereby enhance its nutritive and marketable values. More particularly the invention pertains to a system for co-mingling hot gases, tempered with ambient air, with the material to be processed.

Heretofore many systems have been proposed for drying grain and the like but they have been unsatisfactory for one or more reasons. In some instances the desired degree of dehydration is obtained on some particles whereas other particles are charred. To avoid charring it has been necessary, prior to my invention, to effect the dehydration at such a low rate as to make the cost of the operation prohibitive.

It is therefore a primary object of my invention to provide a system which is highly efficient and easily controlled. A further object of the invention is to provide an apparatus which is simple in construction, economical to manufacture and easy to operate. These and other objects of the invention will become apparent as the description proceeds.

Briefly, according to my invention I employ a vibrating shelf-type drier wherein a temperature differential is maintained and wherein a mixture of coarse and fine material is successively separated, individually dried under optimum conditions, and dried materials recombined before discharge from the drier.

The invention will be described in more detail with reference to embodiments thereof illustrated in the drawings wherein:

Figure 1 is a front elevation;
Figure 2 is a side elevation;
Figure 3 is a vertical section of one embodiment;
Figure 4 is a section taken on line 4—4 in Figure 3;
Figure 5 is a fragmentary section taken on line 5—5 in Figure 3;
Figure 6 is a vertical section of a second embodiment of the apparatus; and
Figure 7 is a plan view of the bottom chute in the apparatus of Figure 6.

The embodiment illustrated in the drawings comprises a rectangular cabinet body 10 mounted on a suitable base 11. The base 11 is provided on its bottom with downwardly projecting axle bearings 12 adapted to carry horizontal axle shafts 14 in transverse and spaced alignment, each axle shaft extending outwardly beyond the cabinet side walls 16 and 17 and the base 11.

Each end of the shafts 14 is equipped with wheels 18 for movably supporting the cabinet body 10. The front end of the base 11 is equipped with a forwardly extending eye bolt 19 to which suitable draft means may be attached for moving the apparatus from place to place.

The rear wall 20 of the cabinet body 10, best shown in Fig. 1, is provided with a centrally placed rectangular anchor plate 21 having a central opening 22, the anchor plate 21 being secured to the rear wall 20 by suitable cap screws 23, and serves as a mounting base for an oil burner 24. The oil burner 24 is provided with outwardly and forwardly projecting arms 25 which are secured to the anchor plate 21 by threaded studs 25a and an exhaust nozzle 26 centrally arranged therewith. By this arrangement the nozzle 26 is positioned within the opening 22 which communicates with a heat chamber 27. When the oil burner 24 is in operation exhaust gases and air are blown through the opening 22 and discharged within the heat chamber 27 centrally and horizontally arranged, situated immediately within the rearward bottom portion of the cabinet body 10.

The heat chamber 27 is constructed of a fire and heat resisting argillaceous material and comprises an elongated cylindrical body 28 closed at its forward end by a wall 29 and provided with horizontally extending cylindrical lateral branches 30, one on each side of the body 28 just rearwardly of the end wall 29. Each of the lateral branches 30 communicates with one of the air spaces 31 adjacent the heat chamber 27 at the bottom of the cabinet body 10.

The rear wall 20 of the cabinet body 10 is provided with a rectangular opening on each side of the anchor plate 21 and adjustably closed by a plurality of rockable louvers 32 mounted in a frame 33, and each group being connected to a control rod 34. Each of the air spaces 31 is further provided with rectangular openings on the same plane adjacent the juncture of the front wall 15 in side walls 16 and 17, respectively, which are similarly equipped with frame 33, louvers 32, and control rod 34. By this arrangement louver-controlled openings in the walls 20, 16 and 17 may be used to avail an operator of the apparatus to take advantage of wind or other air currents which may be present, or to admix fresh air in the spaces 31.

The upper portion of the cabinet body 10 comprises a drying chamber 35 which is provided with conveyor means for gravitationally passing grain in process down and through heated and properly tempered air which has been thoroughly mixed with a limited quantity of exhaust gases from the heat chamber 27.

Referring to Figures 1 to 5, grain is introduced into the drying chamber 35 of the cabinet body 10 through the doorway 36a closed by the trap door 36 which is hinged to the top wall 37 by hinge 38. The trap door 36 is provided with a loop handle 39 for convenience in opening and closing.

The conveyor means in the drying chamber 35 comprises a plurality of inclined chutes 40 having side rails 41 extending substantially from side wall 16 to side wall 17, as best shown in Fig. 3. Each of the two upper side rails 41 is pivoted at its upper end to its adjacent corner post 42 by a suitable bolt 43, the lower end of each side rail 41 being provided with hinge hooks 44 pivotally attached thereto and engaging bolts 45. By this arrangement the degree of inclination may be varied one from another, or all arranged at the same pitch, as desired. Each adjacent corner post 42 is provided with a fixed pin 46 adapted to engage any one of the notches 47 in its associated hook 44.

The side rails 41 carry a partial floor of metal cloth 49, of suitable mesh, extending downwardly and terminating adjacent the lowermost end of the chute 40 to provide discharge ports 46a. By this arrangement the grain being processed will move laterally and be cascaded through the up-flowing heated air onto the chute 40 next below. The bottommost chute 40 is provided with a metal cloth floor 49 which extends the full length of the side rails 41 to point of discharge from the cabinet body 10 through the doorway 50 in the front wall 15. The doorway 50 is provided with a hinged door 51 having a handle 52.

Means for vibrating the chutes 40 comprise a magnetic vibrator 53 mounted on the top wall 37 of the cabinet body 10 and connected to a vertical shaft 54 which, in turn, is connected to each of the chutes 40 by means of an inverted U-shaped frame 54a, the depending arms 55 thereof connected to the side rails 41 by suitable pins 56 intermediate their ends, the pins being guided by slots 57. The vibrator 53 is provided with a rectangular base 63 mounted over an opening 62 and supported on spaced horizontal straps 71 which extend from side wall 16 to side wall 17 substantially at the top thereof and serve to limit vibrations passing to the top wall 37.

The rectangular base 63 and the vibrator 53 is attached to the top wall by suitable cap screws 65, best shown in Fig. 2. The cabinet body 10 is provided with hinged doors 58 in the rear wall 20, equipped with latch bar 59 and keeper 60; and hinged doors 58 in the wall 15 are also equipped with latch bar 59 and keeper 60. The doors 58 serve to give access to the vibrating chutes 40.

The vibrator shaft 54 is threaded to adjustably receive a nut 64. If desired, however, a turnbuckle means can be substituted for the shaft and nut. By either arrangement the depending arms 55 can be raised or lowered to accommodate a changed position of the chutes 40 to equalize suitable vibrations from the vibrator 53. When in proper adjustment, the vibration of the chutes 40 serves to keep the grain in motion so as to expose all surfaces of the kernels to the heated air and gases which ascend through the meshes of the metal cloth 49 and over the top of grain on the chutes 40.

The cabinet body 10 is also provided in the top wall 37 with an exhaust opening communicating with the drying chamber 35 positioned forwardly of the vibrator 53 and over which is mounted an elbow 66 connected to an electrically operated exhaust blower 67 by motor 68. Arranged at the juncture of the elbow 66 and the blower 67 a slidable damper 69 serves as manual control means for regulating the flow of air from the drying chamber 35. The discharge opening of the blower 67 is adapted to be connected to suitable sheet iron pipe of conventional form whereby heated air and gases may be conducted to a suitable distant place and if desired used to preheat the grain introduced into drying chamber 35 as shown in Fig. 6.

Mounted inwardly and forwardly of the doorway 36a, best shown in Fig. 3, is a vertically aligned baffle 72 having a rearwardly projecting flange 70 at each end provided with slotted holes 73 adjustably secured by screws 76 to opposite side walls 16 and 17. This baffle 72 when properly set serves to level the incoming material and thereby limit the quantity of material flowing onto the top-most chute 40. The baffle 72 is arranged in parallel relation with the rear wall 20 and at right angles to the side walls 16 and 17 forming a hopper. By this arrangement material having a high percentage of moisture can be carried through the cabinet body 10 in a relatively small stream in proportion to the absorbtive quality of the stream of heated air and gas in use.

The drying chamber 35 is divided into a plurality of sloping but substantially horizontal zones, one for each of the inclined chutes 40, comprising a top zone 80, an intermediate zone 81 and a bottom zone 82. The inclined chutes 40 may be varied as to pitch either singly or collectively, as desired, and in so doing retard the flow of material in one zone and accelerate the flow in another zone. The temperatures maintained in the drying chamber 35 are controlled in the separate zones and these zones may be operated substantially as follows: in top zone 80 and blower 67 at about 125–150° F.; in the intermediate zone 81 at about 200° F.; and in the bottom zone 82 at about 300° F. The temperature of the dried grain when discharged from the apparatus should not exceed about 100° F.

The apparatus is provided with a thermocouple 79, best shown in Figures 2 and 4, extending through the side wall 16 into the air space 31 and held by the collar 77, the wire 78 being connected to suitable electrical apparatus in junction box 74 for controlling the burner 26 which supplies the hot gases to the drying chamber 35. The temperature of the gases in the exhaust blower 67 can be sensed by a second thermocouple (not shown) and likewise connected to junction box 74 which also holds the necessary conventional controls for the magnetic vibrator 53 and the blower 67.

Referring to Figure 6, the material to be processed is fed from hopper 89 through the perforated standpipe 88, through the port 36a and onto the topmost of the chutes 40. A deflector 93 guides the granular material onto the chute 40 and the depending baffle 72 cooperates therewith to provide a secondary hopper for controllably supplying the granular material to the topmost chute 40. The upper end of chute 40 is pivoted in a manner similar to that described in connection with Figure 3. The lower end of the intermediate chute 40 is likewise pivoted. A plurality of adjustable connecting rods 83 tie the lower end of the upper chute and the upper end of the intermediate chute together. The bottommost chute 86 comprises a plurality of stepped and overlapping plates 87, the plates being imperforate but permitting the flow of hot gases therebetween. A pair of hot gas ducts 85 bypass the louver plate arrangement of chute 86 thereby supplying hot gases from the chamber 27 into the zone 82 between the intermediate chute 40 and the bottom imperforate chute 86.

The chutes 40 and bottom chute 86 are supported by pivoted blocks 92 carried by the arms 55 of the inverted U-shaped frame suspended from the shaft 54 which may be replaced by a turnbuckle. The vibrator 53 is thereby connected to the chutes and serves to agitate the flowing material in the presence of the upflowing hot gases.

The top and intermediate chutes 40 have perforate floors which retain the bulk of the solids causing them to flow laterally to-and-fro within drying zones 80 and 81. The fines are not retained by the screens and fall rapidly through zones 80, 81 and 82 onto the louvered plate chute 86 where the quickly dried fines are co-mingled with dried granular material of larger particle size. The combined and completely dried material passes from the bottom chute 86 and over the flexible canvas belting spillway 90 through the doorway 50 and into such receptacle as may be found convenient for the purpose. A pair of converging deflection plates 91 directs the flow from the bottom chute onto the spillway.

My invention is particularly adapted for use in drying shelled corn, such corn usually averaging a moisture content of between about 20 and 24%. Shelled corn can be safely stored in bins or silos if the moisture content is 15% or less. My operations have shown that I can dry shelled corn from about 24% moisture to a final moisture content of less than 14% at a cost of less than 1 cent per bushel. Other methods cost from about 6 cents to as high as 20 cents.

I employ very efficient heat transfer and since the grain is continuously in motion (it hops on the chute and moves therealong) it is practicable to use relatively high inlet temperatures without overheating the grain. Likewise it is possible to dry the entire mass of grain uniformly, whereas that is not the case when an attempt is made to dry the grain after it is in the storage bin.

In a typical operation of my drier, the inlet temperature of the gases first contacting the grain may be about 300° F., the temperature of the exhaust gases and water vapor about 125° F., and the temperature of the discharged dried grain less than about 100° F. Inasmuch as by my method all of the grain passing through the drier is exposed for the same length of time to the same gases at the same temperatures, I attain a uniform degree of dryness.

Frequently the shelled corn, peas, beans, grain, rice, coffee, etc. contains kernel fragments, chaff, and other fines. My invention permits the handling of such materials without charring or overheating of the fines while effecting the desired dehydration of the coarse material. The combination of the multiple perforated trays or chutes 40 and the final collection of admixing chute 86 at the bottom of the tiered array permits a differential of residence or contact time for the coarse and for the fines without changing the overall composition or size distribution of the fluent mass of solids being treated.

The foregoing description sets forth apparatus and process which may be adapted in use to either batch or to relatively continuous operation. Further by varying the temperature and the rate of movement of the granular material within the drying zones, various sizes of materials and various moisture contents may be processed. Likewise other types of fluent solid materials such as crystals, fibers, powders, etc. can be handled by my system. Accordingly the term granular material is intended to include all such finely divided solids and in particular masses of such solids having mixed particle sizes.

This application is a continuation in part of my co-pending application Serial No. 203,989, filed January 2, 1951, "Vibrating Shelf-type Drier," issued as U. S. Patent 2,702,436.

Although I have described my invention with reference to particular embodiments of apparatus and process it should be understood that this is by way of illustration only and that it is contemplated that variations, modifications and alterations can be made therein without departing from the spirit of my invention.

What I claim is:

1. An apparatus for drying an admixture of finely divided solids and relatively coarse solids which comprises in combination a vertically elongated drying chamber, a plurality of oppositely inclined perforated chutes within said chamber, said chutes being arranged transversely of said chamber and terminating short of opposite walls whereby solids travel slowly over one chute and downwardly on the chute next below in a zig-zag direction countercurrent to the flow of hot gases, a louvered chute subjacent to the bottommost of said perforated chutes, said louvered chute comprising plates which overlap each other so that the hot gases pass upwardly through the louvers and so that the fine material is prevented from falling through, suspension means including means for vibrating said perforated chutes and said louvered chute simultaneously, means integral with said drying chamber for generating hot gasiform fluids, means for discharging said fluids below said louvered chute, conduit means for conducting hot gases from below said louvered chute to below the perforated chute next above, means for exhausting hot gasiform fluids of increased moisture content from said chamber, port means in the top of said chamber for admitting the admixture of solids to the topmost perforated chute, baffle means spaced upwardly from the surface of said topmost chute and adjacent said port to limit the depth of the stream of solids on said chute, and means for preheating the introduced admixture of solids.

2. In combination a drier for fluent material comprising a vehicle having a rectangular cabinet body, a compartment in the bottom portion of said body, a heat generating unit arranged and adapted to discharge hot gases into said compartment, mechanical control means for the admission of atmospheric air into said compartment, a drying chamber comprising the upper portion of said body in communication with said compartment, an exhaust blower arranged upwardly of said cabinet in communication with said drying chamber, an intake doorway in the upper rear portion of said cabinet, a discharge doorway arranged downwardly of said intake doorway in communication with said drying chamber, a plurality of inclined perforated chute means suspended one above the other within said drying chamber for slidably conveying material from said intake doorway, cascade from chute to chute, and to said discharge doorway, the upper chute means having suitable openings therein for separating the fines from the coarse, and an imperforate inclined chute means arranged to collect both fine and coarse material and to convey the mixture to said discharge doorway.

3. The apparatus of claim 2 including conduit means exterior of said drying chamber for precontacting the mixture with gases from said exhaust blower, and a flexible deflector element comprising a projection of the lower end of said collection chute and extending from said drying chamber through said discharge port.

References Cited in the file of this patent

UNITED STATES PATENTS

| 693,455 | Stanley | Feb. 18, 1902 |
| 750,262 | Cooley | Jan. 26, 1904 |
| 1,493,778 | Harrison | May 13, 1924 |
| 1,557,880 | Richter | Oct. 20, 1925 |
| 2,020,504 | Hantla | Nov. 12, 1935 |
| 2,066,251 | Clemens | Dec. 29, 1936 |
| 2,346,176 | McAleer | Apr. 11, 1944 |
| 2,622,342 | Goulounes et al. | Dec. 23, 1952 |

FOREIGN PATENTS

| 373,971 | Great Britain | Nov. 25, 1930 |